June 24, 1930.  J. M. LEATHERMAN  1,767,803
BUTTER SERVING MACHINE
Filed March 7, 1928    4 Sheets-Sheet 1
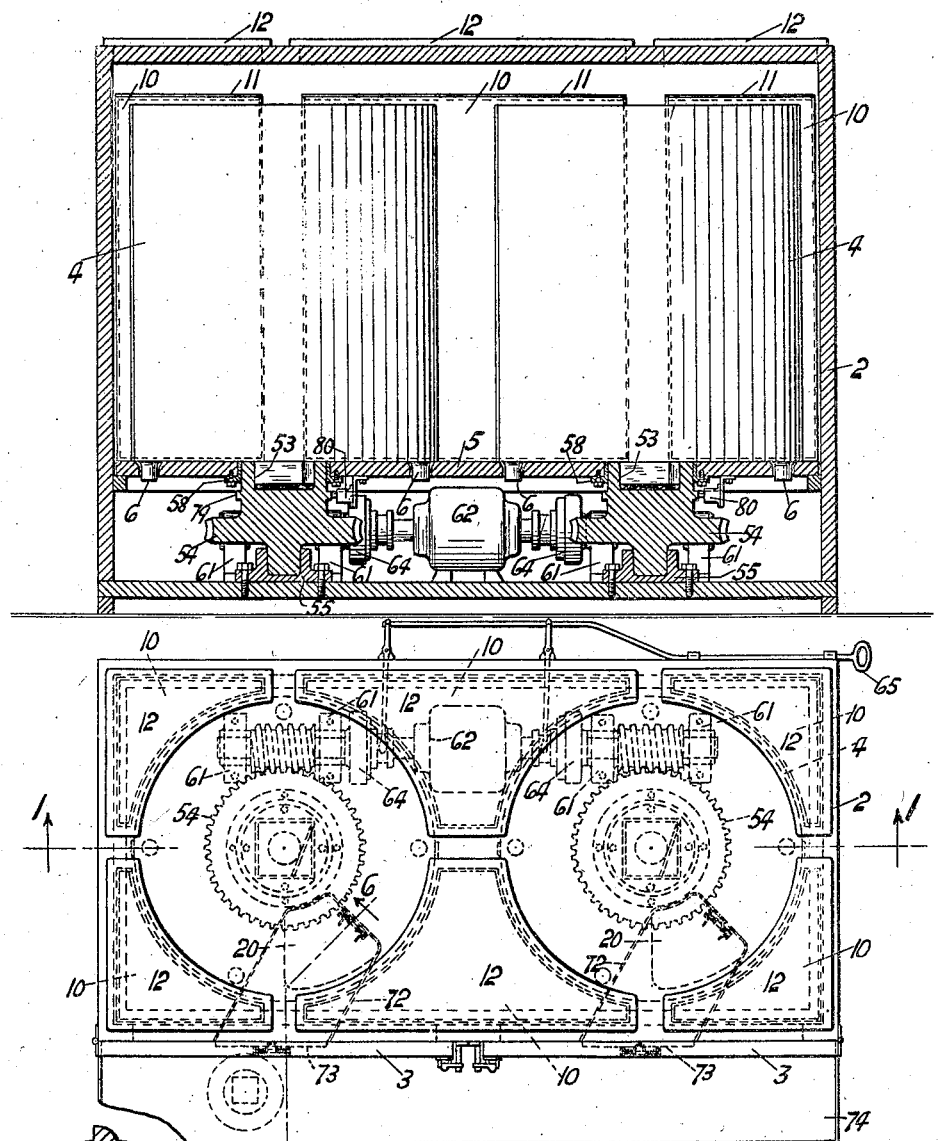
INVENTOR.
JERRY M. LEATHERMAN.
BY
ATTORNEYS.

June 24, 1930.  J. M. LEATHERMAN  1,767,803
BUTTER SERVING MACHINE
Filed March 7, 1928   4 Sheets-Sheet 4

INVENTOR.
JERRY M. LEATHERMAN.
BY
ATTORNEYS.

Patented June 24, 1930

1,767,803

UNITED STATES PATENT OFFICE

JERRY M. LEATHERMAN, OF AKRON, OHIO

BUTTER-SERVING MACHINE

Application filed March 7, 1928. Serial No. 259,643.

This invention relates to a machine for serving butter for use in restaurants, hotels and institutions, the object of the invention being to provide an apparatus for maintaining butter in proper condition and dispensing the butter on chips at such times as required.

The invention consists in the provision of a cabinet having a magazine or magazines therein for a plurality of butter chips, each having a pat of butter thereon, the magazines being filled in the pantry and then loaded into the machine as required. The machine is intended to operate one, two or more magazines so that when one is emptied it can be refilled and replaced while the other magazine is delivering the filled butter chips. The machine is provided with icing receptacles so that the butter is kept in proper condition at all times.

The objects and advantages of the invention will be appreciated by those experienced in the operation of restaurants, hotels and institutions where the conditioning and serving of butter is one of the principal causes of loss in operation. By the use of the machine, it is possible not only to conserve the butter and deliver it quickly and efficiently, but it is possible, with known capacity of the machine, to keep accurate account of the butter properly used. In this way, defalcation of butter may be checked. Other advantages will be secured as can be understood. It will also be appreciated that the invention is shown in the best known form, although improvements or modifications may be made therein without departing from the principles of the invention or sacrificing any of its benefits.

In the drawings,

Figure 1 is a vertical section through one of the machines on the line 1—1 of Figure 2, showing two magazines in place;

Figure 2 is a plan view;

Figure 7 is an enlarged section on the line 7—7 of Figure 4 taken through three trays; and Figure 8 is a detail on the line 8—8 of Figure 3.

Figure 3:
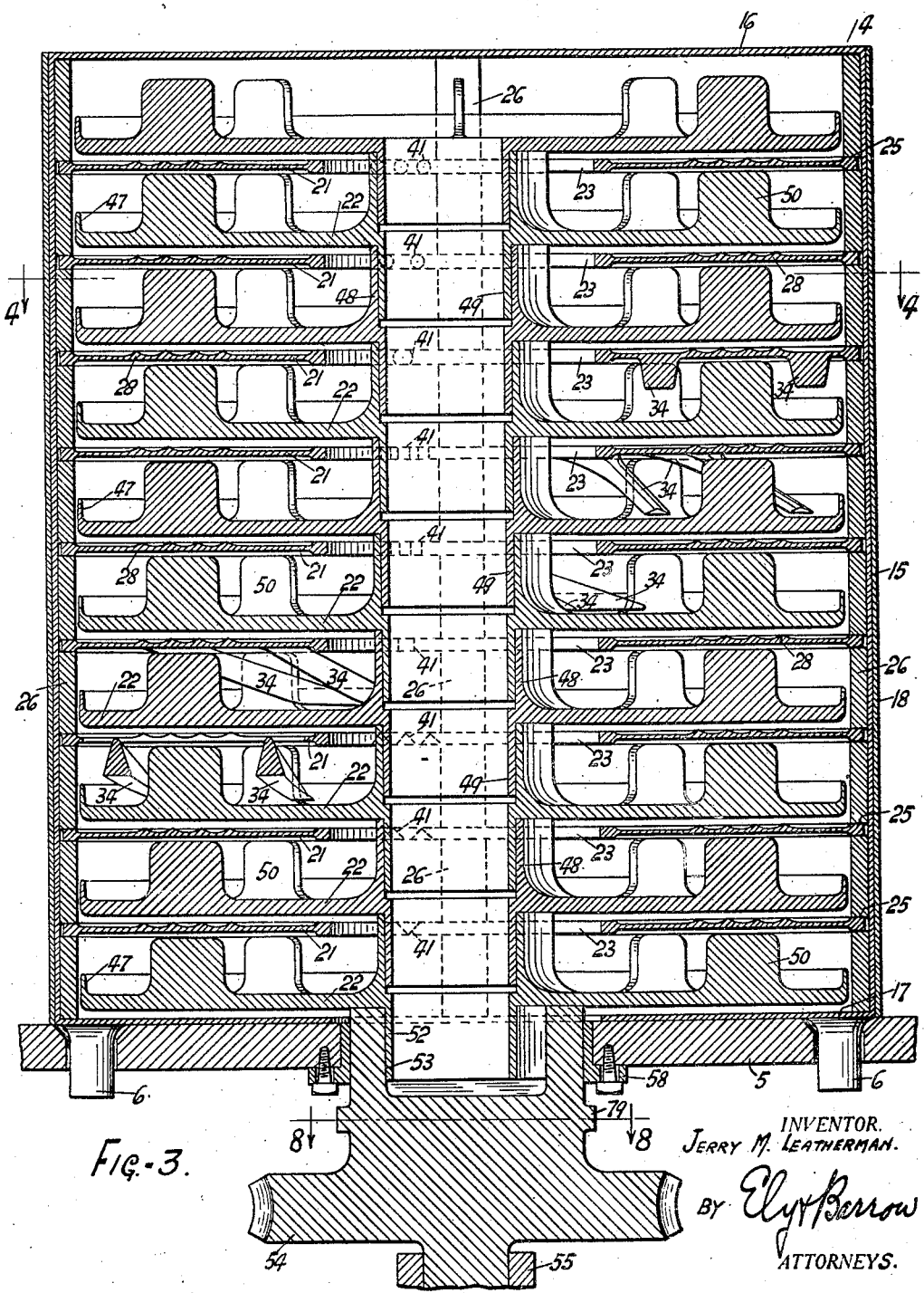
Figure 3 is an enlarged vertical section through a single magazine on the line 3—3 of Figure 4.
Figure 4:
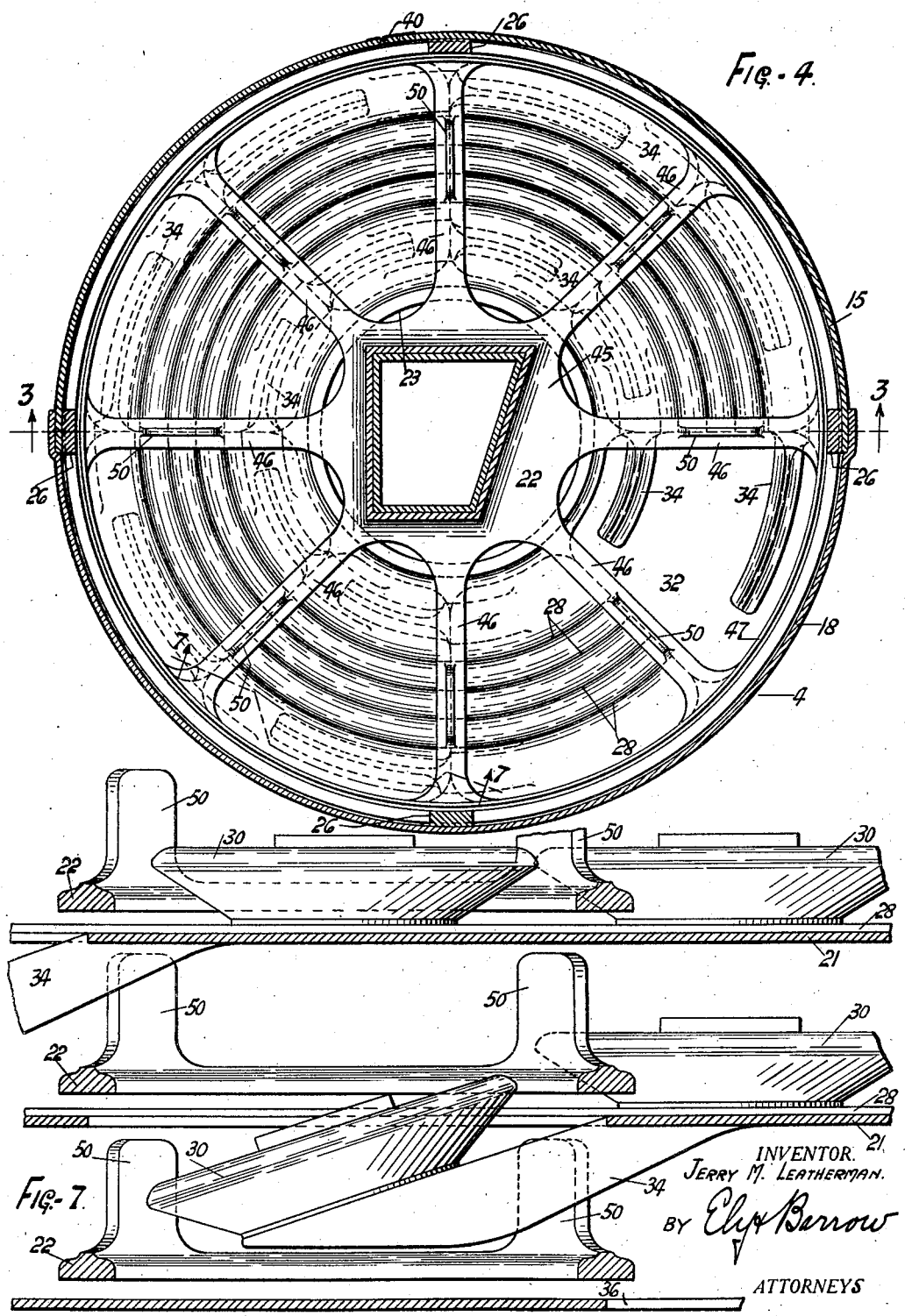
Figure 4 is a section on the line 4—4 of Figure 3.

The machine consists of a large cabinet 2 closed on the sides and top and adapted to be placed on a table or counter in the restaurant or dining room. The front of the cabinet is provided with swinging doors 3, each of which gives access to a single magazine 4. These magazines are cylindrical in form and are seated upon a removable false bottom 5 elevated above the supporting surface, dowels 6 being provided for placement of the magazines. The cabinet has a platform 7 beneath the false bottom for supporting the operating mechanisms for the machine.

In the spaces between the magazines and the walls of the cabinet are situated ice cans 10 which are provided with removable lids 11 for icing the contents of the magazines, the cans being provided with suitable drains, not shown. In the plan view in Figure 2, the magazines are shown as completely surrounded by the ice cans, but the front cans may be omitted if desired for better access to the machine. The top of the cabinet is provided with removable covers 12 for access to the ice cans.

The magazines, which are intended to be filled in the pantry and placed within the cabinet as required, are formed of sheet metal, cylindrical in shape and having a fixed rear walls 15, top 16 and base 17. The front half of the magazine is formed by a removable front wall 18 which completes the enclosed cylindrical magazine. The magazines need not be enclosed as shown, except for the advantages residing in a dirt-proof holder for the butter.

Within a magazine are located a plurality of removable trays 21 and removable sweeps or pushers 22 stacked in alternation, the bottom of the magazine providing the bottom tray. Each tray is formed with an enlarged central opening 23 and is supported by being fitted into notches 25 in vertical rails 26 placed around the interior of the magazine, three being supported on the fixed wall and one on the removable wall. Each tray is preferably provided with circular tracks 28 upon which the filled butter chips 30 are supported and over which they slide. Each tray is also formed with an opening 32 through which the butter chip will pass on to the next lower tray, and at the side of each opening and to the under side of each tray are secured inclines or skids 34 down which the chip will slide when pushed over the opening by the sweeps. The base of the magazine has a similar opening 36 which registers with an opening 37 in the false bottom 5.

Figure 5:
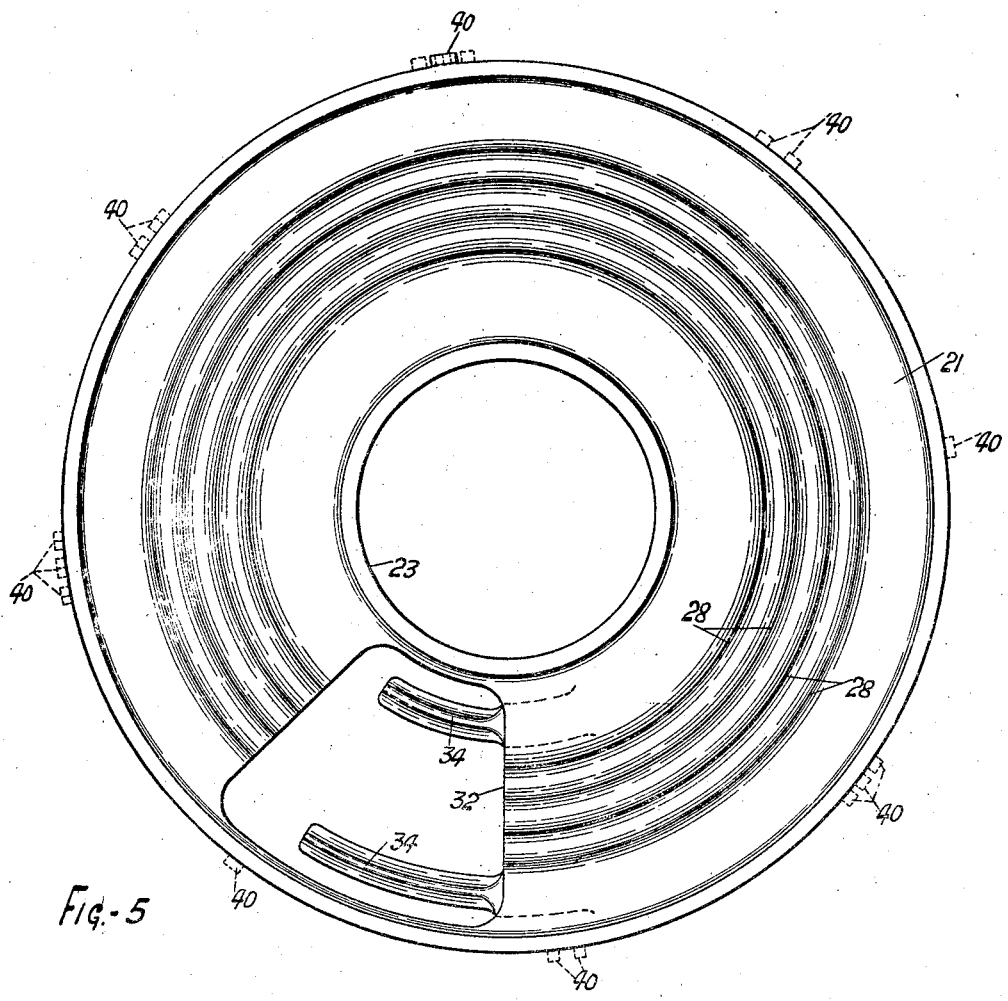
Figure 5 is a plan view of one of the trays.

It will be observed that in order to cause the butter chips to travel through the magazine, it is necessary that the several openings in the trays be located around the magazine in proper spiral order so that as each butter chip passes from one tray to the next lower tray, it will be deposited in an open space on the said tray. In order to insure that the trays are properly placed in the magazine, any suitable means may be provided. As a precaution there is shown a system by which the proper placement of the trays may be insured. Each tray is provided with a peculiarly shaped or individual key formation 40. One of these is shown in full lines in Figure 5, the keys for the other trays of the series being shown in dotted lines at their proper location relative to the opening 32. In the embodiment of the invention as shown, each magazine has nine trays and each tray is provided with a special key which is adapted to be received in a correspondingly shaped opening 41, these openings being arranged in a vertical row in the rear wall of the magazine. It will then be apparent that each tray can be placed only in its proper location in the magazine. The function and location of the keys is optional and the forms shown are merely illustrative. Other means may readily be devised for accomplishing this purpose. It is also to be noted that the number of trays may be increased or diminished and that instead of accommodating a single file of butter chips as shown, the trays may be modified to accommodate a double row of chips. All of the modifications are well within the scope of the invention.

In order to feed the butter chips around the trays, there are provided the sweeps 22 alternating with the trays, each sweep passing over and close to one tray. A sweep consists of hub 45 and radiating spokes 46 providing compartments for a single chip. The spokes are connected by a rim 47 which confines the butter chips. This rim keeps the chips in proper position on the tray. A similar object may be accomplished by leaving the ends of the spokes free and providing a rim on the tray. The spokes may be formed with enlarged fingers 50 to insure engagement with the chips.

The upper side of the hub 45 on each sweep is formed with a non-circular socket 48 and the under side of the hub with a similarly shaped, though smaller projection 49, so that as the trays and sweeps are stacked in the magazine, the parts 49 nest in the sockets 48 and the whole set of sweeps will rotate in unison. The construction just described obviates the necessity for a central shaft which may be substiuted for the interlocking means for the several sweeps.

The under side of the lowermost sweep 22, which feeds the chips around the base of the magazine, fits within a square shaped socket 53 on a driving worm gear 54 beneath the false bottom. The worm gear is seated within a step bearing 55 secured to the platform 7 and the upper side of the gear is rotatable in a bushing 58 secured to the under side of the false bottom 5. The gear 54 is rotated by a worm mounted in bearings 61 on the platform and is driven by a motor 62 also on the platform. The worm extends to either side of the motor to operate the two magazines and clutches 64 may be provided to throw one or the other of said worms in or out of operation, a control lever 65 operating said clutches selectively.

The lowermost sweep passes over the bottom of the magazine and delivers the butter chip to the opening 37 where it depresses a spring elevated trap 20 and then slides into a delivery chute 72 until it rests against a spring closed door 73. When a butter chip is wanted, the door 73 is opened and the loaded chip slides into an open trough 74 in front of the machine. When the door 73 is opened, it automatically closes a switch 75 which starts the motor and actuates the sweeps. The worm gear 54 is provided with a star cam 78, the projections 79 of which actuate a switch 80 which stops the motor so that at a single raising of the door a single chip is delivered to the chute 72. While we are showing individual delivery chutes, it is understood that the delivery may be accomplished by a common chute.

Figure 6:
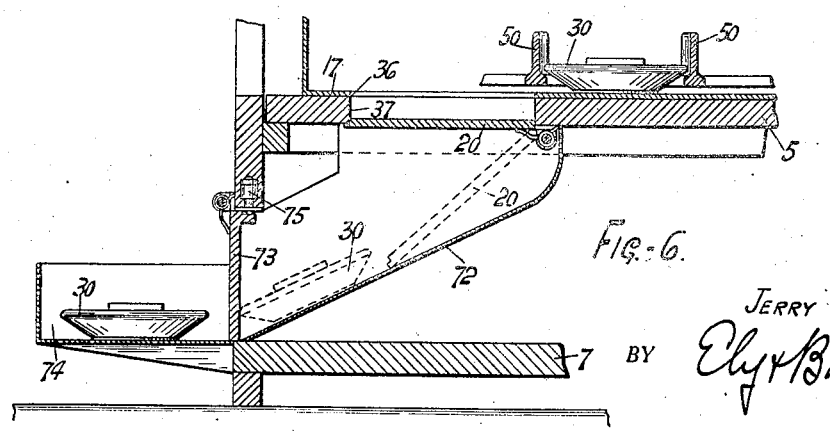
Figure 6 is a section on the line 6—6 of Figure 2.

The operation of the apparatus will be understood from the description which has been given and only a brief review thereof will be made. A magazine with its trays and sweeps being removed from the cabinet and taken to the pantry for filling, the wall 18 is removed and the trays and sweeps taken out of the magazine. The filled butter chips are placed on the trays and each tray replaced in the machine, a sweep being located over the bottom of the magazine and over each tray to define the compartments in which the chips are to be placed. The magazine shown is capable of receiving 80 filled butter chips. It is then closed and taken to the cabinet and placed in position with the dowels 6 in the false bottom and the parts 52 and 53 properly nested. As the door 73 is opened the sweeps all make a partial revolution, the chip in the position shown in Figure 6 is delivered to the chute 72 and the chip adjacent each opening 32 in a tray is passed through that opening to the next tray. This operation continues until the last chip in the top tray passes around each tray and through the opening in that tray to the next and so on, until delivered at the door 73. In this way the butter is kept in perfect condition until it is required for use.

It is apparent that among modifications of the machine the automatic operation of the sweeps may be omitted. It is further evident that changes in the form and proportions of the various parts may be made.

What is claimed is:—

1. In an apparatus for dispensing butter, a cabinet having a vertical refrigerating compartment therein, a magazine received within the cabinet and removable therefrom, said magazine having a plurality of superposed trays therein, each of said trays adapted to receive a plurality of filled butter chips to support them adjacent said compartment, means to pass the butter chips over each tray and over the trays in succession downwardly of said compartment, and a discharge chute at the base of the magazine to receive a butter chip.

2. In an apparatus for dispensing butter, a cabinet having a vertical refrigerating compartment therein, a magazine received within the cabinet and removable therefrom, said magazine having a plurality of spaced vertically arranged trays therein, each tray having an opening, the several openings being spirally arranged about the magazine, sweeps located between the several trays, each sweep having a compartment for the reception of a butter chip or chips, means to rotate the sweeps relative to the trays to pass a chip from the uppermost tray about each tray in succession downwardly of said refrigerating compartment, and a delivery chute at the base of the magazine in which the chip is finally deposited.

3. In an apparatus for dispensing filled butter chips, a cabinet having a refrigerating compartment therein, a removable magazine received within the cabinet, means within the magazine to support a multiplicity of filled, unstacked chips, means to feed the chips in a spiral path adjacent the refrigerating compartment through the magazine, and a delivery chute in which a chip is deposited.

4. A device for the uses and purposes set forth, comprising a plurality of trays arranged in a vertical stack with passageways between the several trays and with openings in each tray, a plurality of sweeps supported independently of the trays and arranged to pass between the trays, means to rotate the sweeps in unison, each sweep having a plurality of compartments adapted to be brought into register with the openings in the trays, and inclined slideways at each opening adapted to discharge into a compartment in the next lower sweep.

5. A device for the uses and purposes set forth, comprising a plurality of trays arranged in a vertical stack with passageways between the several trays and with openings in each tray, the several openings being arranged spirally throughout the stack, a plurality of sweeps supported independently of the trays and arranged to pass between the trays, means to rotate the sweeps in unison, each sweep having a plurality of compartments adapted to be brought into register with the openings in the trays, and inclined slideways at each opening adapted to discharge into a compartment in the next lower sweep.

6. A machine for dispensing butter chips having butter pats placed thereon, comprising a cylindrical magazine, trays in the magazine, each adapted to support filled butter chips arranged thereon in a circle, a discharge chute at the base of the magazine, means for moving all of the chips simultaneously about the trays and discharging a single chip by gravity from one tray to the next lower tray and from the bottom tray to the discharge chute, and an inclined slideway conducting the chips from tray to tray.

7. A machine for dispensing butter chips having butter pats placed thereon, comprising a cylindrical magazine, trays in the magazine, each adapted to support filled butter chips arranged thereon in a circle, a discharge chute at the base of the magazine, rotary sweeps located between the trays, means to rotate the sweeps in unison to move all of the chips simultaneously about the trays and discharging a single chip by gravity from one tray to the next lower tray and from the bottom tray to the discharge chute, and an inclined slideway conducting the chips from tray to tray.

JERRY M. LEATHERMAN.